3,681,014
PURIFICATION OF HYDROGEN CHLORIDE
Homer L. Hackett, Ponca City, Okla., David A. Cullison, Athens, Ga., and Edmond A. Peveto, Westlake, La., assignors to Continental Oil Company, Ponca City, Okla.
No Drawing. Filed June 1, 1970, Ser. No. 42,546
Int. Cl. C01b 7/08
U.S. Cl. 23—154                                   4 Claims

ABSTRACT OF THE DISCLOSURE

The present invention relates to a method of removing unsaturated organic impurities from a gaseous stream of hydrogen chloride. The gas stream is contacted with a liquid reactant selected from the group consisting of chlorosulfonic acid, mixtures of chlorosulfonic acid and sulfuric acid, fuming sulfuric acid and mixtures thereof. Unreacted hydrogen chloride essentially free of unsaturated organic impurities is recovered.

BACKGROUND OF THE INVENTION

(1) Field of the invention

The present invention relates generally to the purification of hydrogen chloride, and more particularly, but not by way of limitation, to a method of removing unsaturated organic impurities from a gaseous stream of hydrogen chloride.

(2) Description of the prior art

In many industrial processes, hydrogen chloride is produced as a by-product. However, very commonly, such by-product streams of hydrogen chloride are contaminated with impurity amounts of unsaturated organic compounds. For example, in the cracking of ethylene dichloride to form vinyl chloride, the by-product hydrogen chloride stream is usually contaminated with impurity quantities of acetylene. Other low boiling organic compounds such as ethylene and vinyl chloride are often found in by-product hydrogen chloride streams in impurity amounts.

Many methods have been developed and used successfully for removing impurities from hydrogen chloride. Also methods for separating and recovering acetylene from gas mixtures using specific solvents have been developed. However, prior to the present invention there has not been available a method for simply and economically removing unsaturated organic compounds such as acetylene from hydrogen chloride to concentrations as low as 100 p.p.m. and below. By the present invention, a method for the removal of unsaturated organic impurities such acetylene, ethylene and vinyl chloride from hydrogen chloride which is simple and economical to carry out is provided.

SUMMARY OF THE INVENTION

The present invention relates to a method of removing unsaturated organic impurities from a gaseous stream of hydrogen chloride comprising contacting the stream with a liquid reactant selected from the group consisting of chlorosulfonic acid, mixtures of chlorosulfonic acid and sulfuric acid, fuming sulfuric acid and mixtures thereof, so that the unsaturated organic impurities are reacted therewith, and recovering unreacted hydrogen chloride essentially free from unsaturated organic impurities.

It is, therefore, a general object of the present invention to provide a method of purifying hydrogen chloride.

A further object of the present invention is the provision of a method for economically removing impurity amounts of unsaturated organic compounds from hydrogen chloride.

Yet a further object of the present invention, is the provision of a method for the removal of unsaturated organic impurities from a stream of gaseous hydrogen chloride wherein an essentially impurity-free hydrogen chloride stream is recovered.

Further objects and advantages of the present invention will be evident from the following detailed description.

DESCRIPTION OF THE PREFERRED EMBODIMENTS

Broadly described, the present invention comprises contacting a gaseous stream of hydrogen chloride containing impurity amounts of unsaturated organic compounds with a liquid reactant selected from the group consisting of chlorosulfonic acid, mixtures of chlorosulfonic acid and sulfuric acid, fuming sulfuric acid and mixtures thereof. The unsaturated organic compounds contained in the gas stream react with the liquid reactant to form a liquid reaction product and the unreacted hydrogen chloride, essentially free of unsaturated organic compounds, is recovered. The reaction product obtained may be neutralized and discarded, or if desirable, the liquid reactant may be reclaimed by subjecting the reaction product to atmospheric distillation which causes the decomposition thereof. The liquid reactant is recovered as the overhead product from the distillation process.

The present invention is based on the discovery that acetylene and other similar unsaturated organic compounds such as ethylene and vinyl chloride, commonly found as impurities in by-product hydrogen chloride streams, react with chlorosulfonic acid to form a liquid reaction product. Further, the reaction takes place at a very rapid rate making it possible to treat a relatively high volume of hydrogen chloride with a relatively small quantity of chlorosulfonic acid to obtain essentially pure hydrogen chloride. In addition to chlorosulfonic acid, mixtures of chlorosulfonic acid and sulfuric acid and fuming sulfuric acid may be employed as the liquid reactant in accordance with the present invention. Sulfur trioxide is released by the fuming sulfuric acid which is in turn rapidly converted to chlorosulfonic acid by reaction with a portion of the gaseous hydrogen chloride.

The specific identification of the product formed by the reaction of chlorosulfonic acid with unsaturated organic compounds is not presently known by the applicants. In the case of the reaction between acetylene and chlorosulfonic acid, the reaction product appears to be a cyclic compound with two carbon atoms from the acetylene in the ring as well as sulfur and oxygen atoms from two molecules of chlorsulfonic acid in the ring. While sulfuric acid alone is not effective in reacting with and removing unsaturated organic impurities from hydrogen chloride gas, it has been found that a mixture of sulfuric acid and chlorosulfonic acid is effective in that one of the sulfur atoms in the reaction product is supplied by the sulfuric acid. Since sulfuric acid is less costly to produce than chlorosulfonic acid, use of a mixture of chlorosulfonic acid and sulfuric acid is more economical than using pure chlorosulfonic acid.

A preferred liquid reactant for use in accordance with the present invention is a mixture of 50% by weight chlorosulfonic acid and 50% by weight sulfuric acid.

As will be understood by those skilled in the art, the method of the present invention may be carried out using any of a variety of conventional apparatus. For example, a quantity of the liquid reactant of the present invention may be contained in a tank or vessel with the stream of gaseous hydrogen chloride simply being bubbled therethrough. When the liquid reactant becomes spent, it is replaced with a new charge of liquid reactant.

Another technique for carrying out the method of the present invention is as follows: In a suitable vessel packed with conventional vapor-liquid contact inducing material, such as glass beads, porcelain saddles, etc., the liquid reactant is passed downwardly countercurrently to the stream of hydrogen chloride to be purified. Spent liquid reactant is removed from the bottom of the vessel with the purified hydrogen chloride stream being recovered and removed from the top of the vessel. The spent liquid reactant may be neutralized and discarded, or passed to a distillation process wherein the reaction product is decomposed and the liquid reactant recovered as overhead product.

The contact temperature of the gas stream and liquid reactant is preferably maintained in the range of from 25° C. to 50° C., however, contact temperatures other than the given preferred range may be employed so long as the liquid reactant remains in the liquid state. The contact pressure is preferably maintained from about one atmosphere to about 40 atmospheres, but higher contact pressures may be utilized so long as the hydrogen chloride remains in the vapor state.

The invention can be better understood by referring to the following examples:

EXAMPLE 1

A vertical tubular glass column, 2½ feet high and 2 inches in diameter, was filled to a depth of 2¼ feet with 3 mm. glass beads. The glass beads were covered with 51 grams of chlorosulfonic acid. A hydrogen chloride gas stream containing 0.402% by volume acetylene was injected into the column at the bottom thereof at the rate of 629 cc./min. The essentially acetylene-free gas stream exiting from the top of the glass vessel was periodically analyzed for acetylene content by gas chromatography. The results of the analyses are set forth in Table I, hereinbelow:

TABLE I

| Time (minutes): | Acetylene content of exit hydrogen chloride stream, vol. percent |
|---|---|
| 0 | 0.402 |
| 60 | ----- |
| 120 | ----- |
| 180 | 0.0011 |
| 240 | 0.0021 |
| 340 | 0.0065 |
| 390 | 0.0075 |
| 555 | 0.0082 |
| 600 | 0.0093 |
| 660 | 0.0104 |
| 720 | 0.0154 |

EXAMPLE 2

A stream of gaseous hydrogen chloride containing 1.21% by volume acetylene was bubbled upwardly through 50 cc. of chlorosulfonic acid contained in a glass cylinder at the rate of 629 cc./min. The essentially acetylene-free exit gas was periodically sampled and analyzed by gas chromatography. The results obtained from the analyses are set forth in Table II below:

TABLE II

| Time (minutes): | Acetylene content of exit hydrogen chloride stream, vol. percent |
|---|---|
| 0 | 1.21 |
| 10 | 0.051 |
| 25 | 0.040 |
| 45 | 0.030 |
| 60 | 0.019 |
| 90 | 0.020 |

As shown in Table II, approximately 98% of the acetylene contained in the hydrogen chloride stream was removed by the chlorosulfonic acid liquid reactant.

EXAMPLE 3

A hydrogen chloride gas stream containing 2500 p.p.m. acetylene was purged through 35 ml. of fuming sulfuric acid contained in a 300 cc. glass vessel. The acetylene content of the gas exiting from the vessel contained less than 50 p.p.m. acetylene.

From the foregoing description of the invention, it will have become apparent that an improved method of removing unsaturated organic impurities such as acetylene, ethylene and vinyl chloride from hydrogen chloride is provided.

Although certain specific embodiments of the invention have been described as exemplary of it's practice, these examples are not intended to limit the invention in any way, or to constitute a definition of it's true scope. Other process parameters and materials may be used in accordance with the broad principles outlined herein, and when so used, are deemed to be circumscribed by the spirit and scope of the invention, except as necessarily limited by the appended claims or reasonable equivalents thereof.

What is claimed is:

1. A method of removing impurity amounts of acetylene and the like from a gaseous stream of hydrogen chloride comprising:
    contacting said gas stream with a liquid mixture comprised of chlorosulfonic acid present in an amount of about 50% by weight and sulfuric acid present in an amount of about 50% by weight, so that said acetylene and the like impurities are reacted therewith; and
    recovering a stream of unreacted hydrogen chloride essentially free from said impurities.

2. The method of claim 1 wherein the contacting is carried out at a temperature of from about 25° C. to about 50° C.

3. The method of claim 2 wherein the contacting is carried out at a pressure of from about 1 atmosphere to about 40 atmospheres.

4. A method of removing impurity amounts of acetylene and the like from a gaseous stream of hydrogen chloride comprising:
    contacting said gas stream with a liquid mixture comprised of chlorosulfonic acid present in an amount of about 50% by weight and sulfuric acid present in an amount of about 50% by weight, so that said acetylene and the like impurities are reacted therewith;
    recovering a stream of unreacted hydrogen chloride essentially free from said impurities; and
    distilling the obtained reaction product to bring about the decomposition thereof and the recovery of said liquid mixture as overhead product.

References Cited

UNITED STATES PATENTS

| 2,558,011 | 6/1951 | Sprauer et al. | 23—154 |
| 2,288,865 | 7/1942 | Baehr et al. | 23—154 X |
| 2,303,537 | 12/1942 | Frost, Jr. | 23—154 |
| 3,446,586 | 5/1969 | Young | 23—154 |

EDWARD STERN, Primary Examiner

U.S. Cl. X.R.

23—2 R, 139, 152, 166, 167, 172